Figure 1:
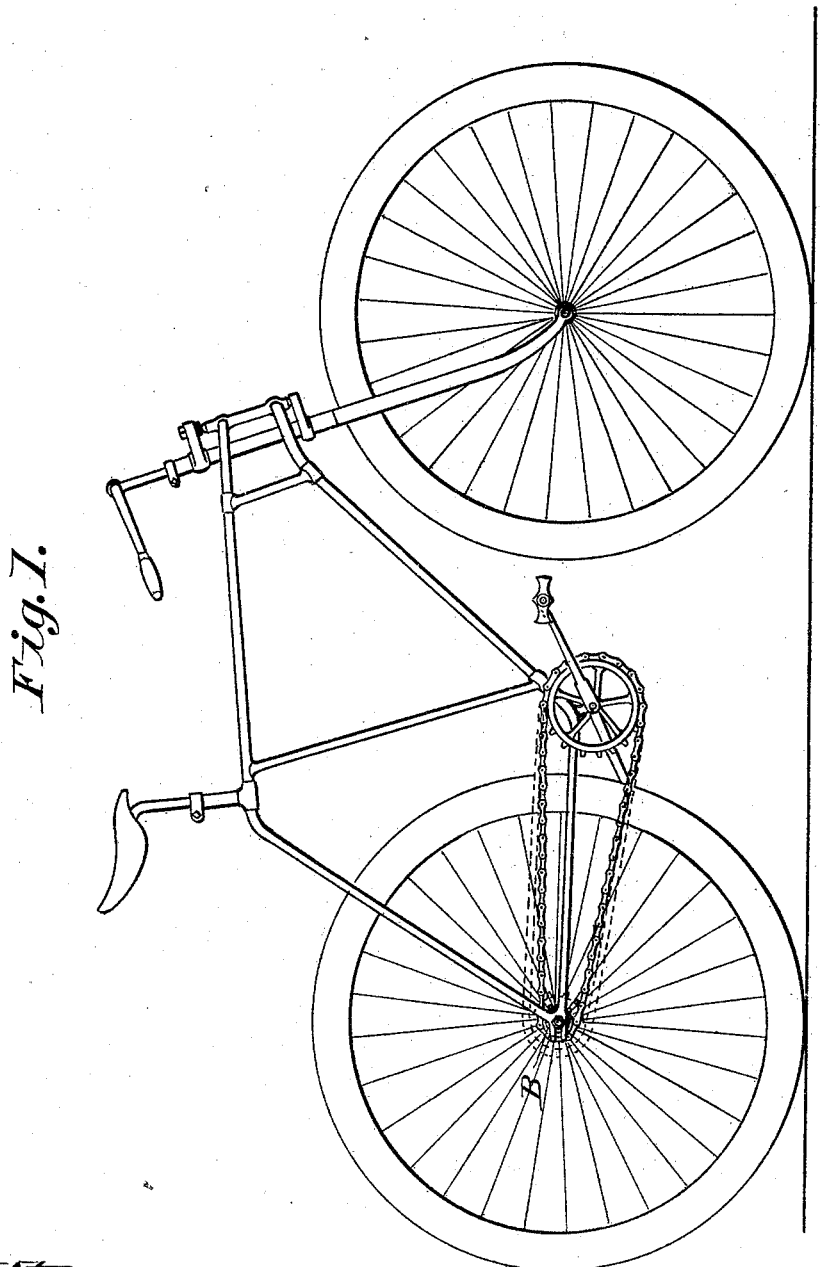

(No Model.) 2 Sheets—Sheet 1.
J. P. KELLY.
SPROCKET WHEEL FOR VELOCIPEDES.

No. 497,279. Patented May 9, 1893.

Witnesses:
J. A. Garfield
K. J. Clemons.

Inventor:
Jarvis P. Kelly,
per Chapin & Co.
Attys.

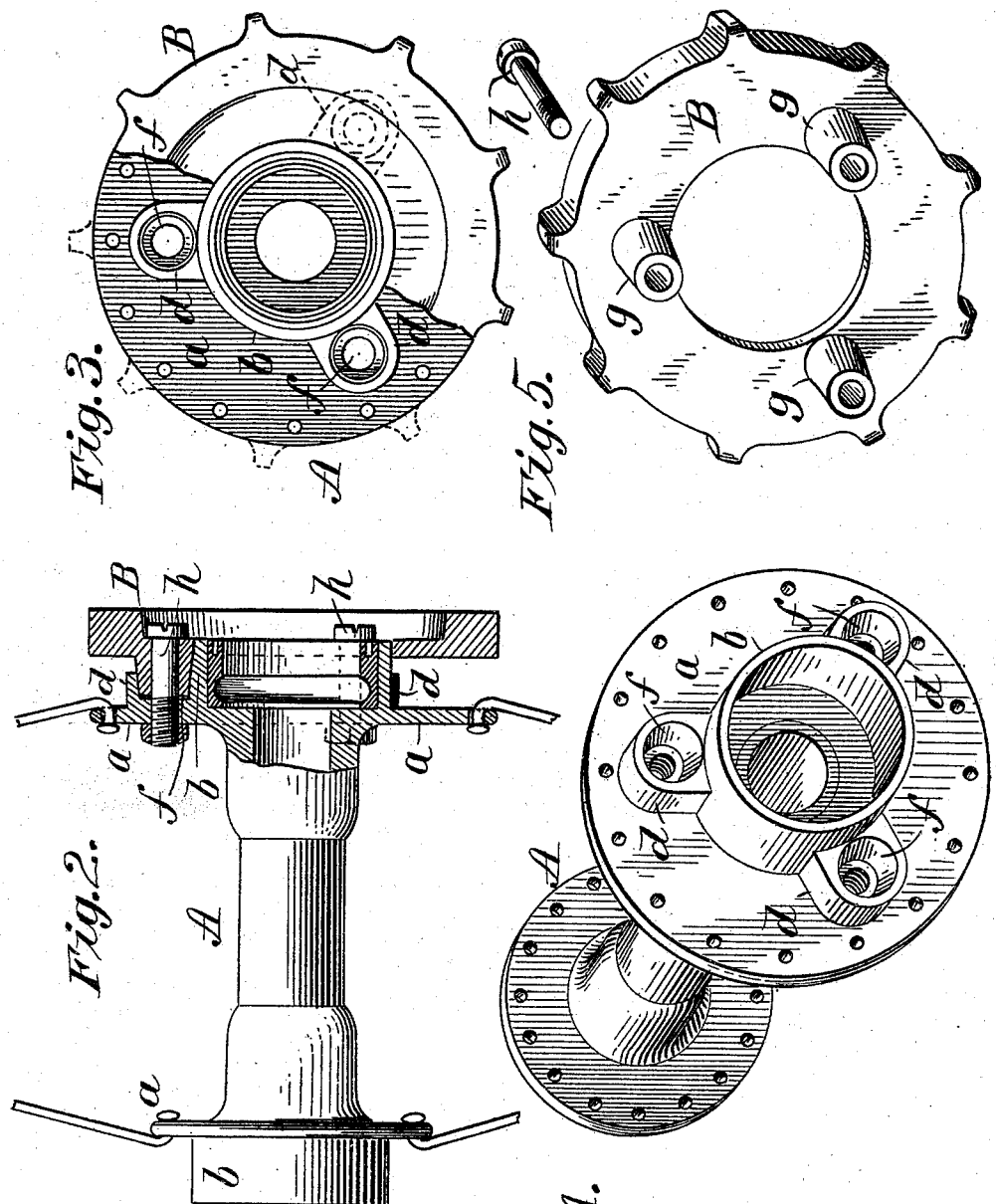

UNITED STATES PATENT OFFICE.

JARVIS P. KELLY, OF CHICOPEE, MASSACHUSETTS, ASSIGNOR TO THE WARWICK CYCLE MANUFACTURING COMPANY, OF SAME PLACE.

SPROCKET-WHEEL FOR VELOCIPEDES.

SPECIFICATION forming part of Letters Patent No. 497,279, dated May 9, 1893.

Application filed July 30, 1892. Serial No. 441,761. (No model.)

*To all whom it may concern:*

Be it known that I, JARVIS P. KELLY, a citizen of the United States, residing at Chicopee, in the county of Hampden and State of Massachusetts, have invented new and useful Improvements in Sprocket-Wheels for Velocipedes, of which the following is a specification.

This invention for improvements in safety bicycles or other types of velocipedes especially pertains to the sprocket wheel and the hub of the rear or driven wheel with which such sprocket wheel is combined.

The object of the invention is to so peculiarly construct both the sprocket end of the wheel hub, and the sprocket wheel for application thereon, that the sprocket wheel may be readily attached at pleasure or removed for substitution of another sprocket wheel which is similar in all respects, except as to diameter and number of teeth; and so that the position of the sprocket wheel may be changed,—that is, set around on the wheel hub, whereby the wear on the teeth by the driving chain may be equalized.

The invention consists in the construction and combination of parts all substantially as will be hereinafter fully described and pointed out in the claims.

In the accompanying drawings:—Figure 1 is a side elevation of a safety bicycle with incation,—by dotted lines of substituted sprocket wheel and changed driving chain,—of its adaptability for a different speed. Fig. 2 is an axial section of the sprocket end portion of the hub of the driven wheel with the interchangeable sprocket combined therewith, the remaining portion of the hub being seen in side view. Fig. 3 is an end face view of said parts with a half of the sprocket wheel broken away for clearer illustration. Figs. 4 and 5 are perspective views of the improved wheel hub and sprocket wheel separated the one from the other.

In the drawings A represents the hub of the rear or driven wheel of a safety bicycle, or other type of velocipede, which has the axial bore for the loose passage therethrough of the axle. The hub has, near each end, the transversely extended flange, $a$, for the connection therewith of the spokes; and, projecting from the end faces of the flanges, are the concentric integral rims or annular lips, $b$, within which are inclosed or may be formed the race rings of the ball bearings formed on and between the hub and axle. The flange at the sprocket end of the hub has integrally on its outer face outside of said annular lip three lugs, $d$, which are equidistant from each other and from the axis of the hub; and these lugs have circular recesses, $f$, therein which are parallel with the hub axis and which are preferably tapered inwardly for a part of the distance toward the inner face of the hub flange, the perforation for the remainder of such distance being constituted by the tapped hole of less diameter.

Three bosses, $g$, are formed upon and extended from the inner side of the sprocket wheel, B, they being equidistant from each other and all at the same distance from the center of the sprocket wheel corresponding to the arrangement of the aforesaid holes, $f$, which are formed in the end of the hub flange. These bosses are preferably tapered to correspond to the taper of the outer sections of the aforesaid holes, $f$, whereby they may be seated peripherally therein without necessarily "bottoming;" and the sprocket wheel is drilled from its outer side axially through the said bosses so that when the sprocket wheel is in engagement with the hub, as seen in Fig. 2, a confining screw, $h$, may be passed through each boss and with a screw engagement through the tapped portion of the hole, $f$. These tapered bosses are, therefore, so constructed with respect to the dimensions of the tapered portions of the holes, $f$, that, while they are in close peripheral contact with the borders of the tapered sections of the holes not, necessarily, being seated at the base of said tapered portions, the entire strain in the driving of the machine thereby comes between the sprocket wheel and hub at the sides of the said bosses, such strain being resisted by the reinforced portions of the hub which are constituted by the lugs, $d$; the screws, $h$, are therefore relieved of all strain, they merely serving the purpose of holding the parts from disengagement. The screws, $h$, are preferably extended beyond the inner face of the flange, $a$, and receive lock-nuts thereon.

Having the bicycle equipped with a hub, substantially as described, one of several sprocket wheels having the relatively corresponding arrangement of bosses, g, but of varying diameters and numbers of teeth, may be readily applied, or interchanged, thereby rendering the vehicle capable of being driven a longer or shorter distance on a given revolution of the pedals, according as the applied sprocket wheel is smaller or larger. And by reason of the capability which each sprocket wheel has of being engaged with the hub when turned relative thereto a third or two-thirds of a rotation those teeth which had been most worn by the chain may be given such altered positions as to bring the teeth which may be less worn subject to the abrading action of the chain and thereby the sprocket wheel is rendered more efficient and durable than usual.

The sprocket wheel is made in ring form, as seen, whereby in its engagement with the hub it may surround the said annular lip for containing part of the ball bearing and whereby the inclosing cap of the ball bearing may be applied without impediment by said sprocket wheel.

It is, of course, manifest that the number of holes, f, and bosses, g, may be greater than three, although such number is preferred as being ample in carrying out the invention, and at the same time involving no unnecessary finishing labor.

What I claim is—

1. In a velocipede, the combination with the hub of one of the wheels having on its end portion a series of holes which are equidistant from each other and from the axial center of the hub, of the detachable sprocket wheel having a series of bosses projected from its inner face in the same arrangement as, and adapted to engage, the holes in the hub, and the confining screws or bolts passed through the sprocket wheel axially of the said bosses and having an engagement with the hub, substantially as described.

2. In a velocipede, the combination with a hub of one of the wheels having on its end portion the flange, a, provided with the annular lip for the race ring of the ball bearing and with the radially arranged lugs, d, which are equidistant from each other and from the axial center of the hub and having holes therein of the detachable sprocket wheel having a series of bosses projected from its inner face in the same arrangement as, and adapted to engage the holes in the said lugs of the hub, and the confining screws or bolts passed through the sprocket wheel axially of the said bosses and having an engagement with the said hub flange, substantially as described.

3. In a velocipede the combination with the hub of one of the wheels having on its end portion the flange, a, provided with the annular lip, b, for the race ring of the ball bearing, and with the radially arranged integrally formed lugs which are equidistant from each other and the center of the hub, and having the holes, f, therethrough the outer portions of which are tapered, as described, and the inner portions of which are tapped, of the sprocket wheel having the series of tapered bosses projected from its inner face and in the same arrangement as and adapted to engage the holes in said lugs of the hub, and the confining screws or bolts passed through the sprocket wheel axially of the said bosses and having an engagement with the said hub flange, substantially as described.

4. In a velocipede the combination with the hub of one of the wheels having on its end portion the flange, a, provided with the outwardly projected annular lip, b, for the race ring of the ball bearing, and with the radially arranged integrally formed lugs outside of said annular lip, which are equidistant from each other and the center of the hub, and having the holes, f, therethrough as described, of the annular sprocket wheel adapted to surround said annular lip, b, and having the series of tapered bosses projected from its inner face and in the same arrangement as and adapted to engage the holes in said lugs of the hub and the confining screws or bolts passed through the sprocket wheel axially of the said bosses and having an engagement with the said hub flange, substantially as described.

JARVIS P. KELLY.

Witnesses:
H. A. CHAPIN,
WM. S. BELLOWS.